United States Patent
Taylor

(10) Patent No.: US 7,334,956 B2
(45) Date of Patent: Feb. 26, 2008

(54) COUPLER

(76) Inventor: Steve B. Taylor, 4908 Hawkins, NE., Albuquerque, NM (US) 87109

( * ) Notice: Subject to any disclaimer, the term of this patent is extended or adjusted under 35 U.S.C. 154(b) by 696 days.

(21) Appl. No.: 10/600,379

(22) Filed: Jun. 20, 2003

(65) Prior Publication Data

US 2004/0258460 A1    Dec. 23, 2004

(51) Int. Cl.
  *F16C 11/00*    (2006.01)
  *B63B 17/00*    (2006.01)
(52) U.S. Cl. .................................. 403/87; 114/361
(58) Field of Classification Search .................. 403/57, 403/58, 83–87, 90, 112, 113, 114, 119, 120; 114/361 X, 270, 364; 411/533
  See application file for complete search history.

(56) References Cited

U.S. PATENT DOCUMENTS

| | | | |
|---|---|---|---|
| 960,899 A | 6/1910 | Guyer | |
| 1,257,536 A * | 2/1918 | Schroeder | ................... 403/90 |
| 3,008,259 A | 11/1961 | Zornes | |
| 3,176,805 A | 4/1965 | Gandy | |
| 3,377,088 A | 4/1968 | Millay et al. | |
| 3,382,630 A | 5/1968 | Chivers | |
| 4,406,474 A | 9/1983 | Scharf | |
| 4,561,797 A * | 12/1985 | Aldridge | ...................... 403/58 |
| 4,830,557 A | 5/1989 | Harris et al. | |
| 5,163,652 A | 11/1992 | King | |
| 5,326,206 A | 7/1994 | Moore | |
| 5,352,056 A | 10/1994 | Chandler | |
| 5,405,347 A * | 4/1995 | Lee et al. | ................... 403/103 |
| 5,697,320 A * | 12/1997 | Murray | ....................... 114/361 |
| 5,704,749 A * | 1/1998 | Landgrebe | ............... 411/366.2 |
| 6,053,122 A * | 4/2000 | Jordan, III | ................... 114/255 |
| 6,142,438 A * | 11/2000 | Cooper et al. | .............. 248/250 |
| 6,488,644 B1 * | 12/2002 | Ostrom et al. | ................ 403/87 |
| 6,594,860 B2 * | 7/2003 | Czipri | ......................... 16/367 |

* cited by examiner

*Primary Examiner*—Daniel P. Stodola
*Assistant Examiner*—Victor MacArthur
(74) *Attorney, Agent, or Firm*—Ray R. Regan

(57) ABSTRACT

A coupler for to which a shaft is attachable is provided. includes a base. The base is formed with an upper side and an lower side. The lower side is substantially a flat planar surface. Means are provided for mounting the base on a curved surface. A preferred means is one or more ball washer assemblies. In addition, the present invention includes a tub that is adjustably connectable to the base. A plug is provided that is repositionably attachable to the tub. In addition, a neck is provided. The neck is insertable into the plug. The neck also is formed to support a shaft. The invention includes a clevis mechanism that is slidably and demountably engageable with both the plug and the neck.

10 Claims, 14 Drawing Sheets

COUPLER

FIELD OF THE INVENTION

The present invention pertains generally to installing load-bearing shafts on variously shaped surfaces. More particularly, the new and useful invention claimed in this document pertains to a variably positionable coupler mountable on a curved surface and capable of securing a shaft in a variety of positions. The present invention is particularly, but not exclusively, useful for mounting a shaft that is part of a wakeboard tower on the curved surface of a boat hull.

BACKGROUND OF THE INVENTION

Myriad shafts are used and deployed to secure loads. The term "shaft" as used in this document includes at least non-exclusive items such as poles, handles, bars, pins, axle, rod and other shafts. While shafts are thought of as primarily cylindrical, the cross-sectional shape of a shaft is not a limitation of the present invention. Loads placed on a shaft may arise from a variety of forces, either alone or in combination. Sources for such forces may include wind, air, and other elements. As is commonly known, when one or more forces acts on a shaft, a torque may be formed whose vector along an x-axis may tend to produce a rotation around the y-axis known as precession. Precession may generate significant angular velocities or torques. These forces may individually and collectively contribute to inducing rapid wear of shafts and any connecting parts to which shafts are mounted. Such forces also may create reciprocating forces that may lead to even higher stresses and vibrations as forces increase on or along a shaft. Such forces may be transmitted to connectors holding a shaft to a surface, and may buckle or degrade the surface itself.

In an environment noted as one non-exclusive example, tower structures called wakeboard towers often are mounted on boats and other vessels (collectively, "boats"). Wakeboard towers include a number of shafts secured to a boat hull. During operation of a boat having a wakeboard tower, particularly operation of a boat at significant speeds, forces are applied to the wakeboard tower components, and to the hull of a boat to which the tower is mounted. Such forces may arise from the velocity of the boat, air pressure, wind, rain and other elements. The forces applied are not exclusively linear; such forces also may be eccentrically applied against the shaft, and to the hull surface to which the tower is attached.

A significant problem for mounting such towers on boats arises from the fact that boat hulls, particularly where it would be advantageous to mount shafts associated with such towers, are commonly curved rather than straight or planar. Therefore, conventional devices for mounting the shafts included in such apparatus as wakeboard towers must either be mounted in a single position only, or the shape of the boat hull must be formed or modified to accommodate the mounting gear. None of the current solutions for mounting the shafts that comprise such a tower provide an apparatus for mounting the tower shafts on a universe of curved surfaces. Also, none of the methods for mounting such shafts provides a variably positionable universal device mountable on a curved surface that avoids modifying an existing surface on which the shaft is to be attached.

Therefore, a previously unaddressed need exists in the industry for a new and useful apparatus, and method for manufacturing such an apparatus, capable of being mounted on a curved mounting surface that also is capable of being adjusted to accommodate any dimension and configuration of boat hull or other structure to which the apparatus is attached. Particularly, there is a significant need for a variably positionable coupler system mountable on a curved surface that overcomes the effects of forces that may be applied to a shaft mounted on such a coupler system, and allows a user to configure the coupler to accommodate the size and shape of the object on which the coupler is mounted.

In prior approaches, various means have been suggested for mounting shafts on curved surfaces and for distributing the effect that forces on shafts. In the environment of boats, various suggestions have been offered for mounting wakeboard towers on boats. Such solutions have several limitations. One limitation is the need to custom design a wakeboard tower installation to a specific boat and to a specific boat's dimensions. An alternative solution has been to insert rubber or other malleable material in, for example, multiple points of connection between a shaft and the apparatus suggested for mounting the shaft on a curved surface. Most solutions, however, also are limited to providing a single bolt on which all forces and stresses are applied during operation of a boat. Finally, in the boat industry, no effort has been made to offer a standardized variably positionable coupler that is universally adjustable for accommodation to any dimension of the boat, any dimension of shafts, and to any shape of the hull of a craft, including a curved surface.

The advantages, objects and features of the coupler system of the present invention will, therefore, become apparent to those skilled in the art when read in conjunction with the accompanying following description, drawing figures, and appended claims.

SUMMARY OF THE INVENTION

Given the conventional solutions for attempting to solve the problems associated with mounting a shaft on a curved surface, it would be desirable, and of considerable advantage, to provide a coupler universally adaptable to any sized boat and any configuration of hull. The coupler of the present invention provides numerous advantages in connection with providing a variably positionable coupler mountable on a curved surface. At least one advantage and object of the present invention is to provide an apparatus for demountably positioning a shaft on the hull of a vessel at a location on the hull that does not present a flat surface, but rather may provide only a curved or undulating surface.

Yet another object of the present invention is to provide a coupler system that may be installed on a curved surface without modifying the shape or configuration of the boat hull or other curved surfaces.

Another object of the present invention is to provide a coupler system that is universally useable in connection with any sized boat, and any sized shaft of a wakeboard tower that such a shaft may be part of.

Still another object of the present invention is to provide a coupler system that resists forces applied to the coupler system, to the shaft connected to the coupler system, and to the surface to which the coupler system is attached.

Another object of the present invention is to avoid the expense of machining, shaping, and molding components in numerous configurations so as to fit each corresponding shape of a mounting surface.

It is yet another advantage of the present invention to use one or more ball washers to contribute to the present invention's ability to accommodate to any configuration of a mounting surface.

Still another advantage of the present invention, and another object of the present invention, is to provide a coupler system, and a method for manufacturing a coupler system, that respectively are easy to use and to practice, and that are cost effective for their intended purposes.

These and other objects of the present invention are achieved by providing a coupler that includes a base. The base is formed with an upper side and an lower side. The lower side is substantially a flat planar surface. Means are provided for mounting the base on a curved surface. As will be explained, the mounting means preferably includes one or more ball washer assemblies. In addition, the present invention includes a tub that is adjustably connectable to the base. A plug is provided that is repositionably attachable to the tub. In addition, a neck is provided. The neck is insertable into the plug. The neck also is formed to support a shaft. The invention includes a clevis mechanism that is slidably and demountably engageable with both the plug and the neck.

To those skilled in the art, it will become equally apparent that the use of ball washers as provided in the present invention is unique and novel, and unlike the use of ball washers in connection with other inventions. Although ball washers have been used in other inventions, their use has not been for the same or similar principle of operation described in this document. Indeed, ball washers have been used to solve different problems. Ball washers primarily have been used to adjust for misalignment of holes in adjoining plates or bodies. Thus, ball washers have been used where the longitudinal axes through the centers of adjacent holes are not coincident, and therefore would not allow the use of conventional straight connectors such as bolts. In those circumstances, when adjacent holes are not in alignment, a ball washer has been a suggested solution.

It also will become apparent to those skilled in the art that the objects and advantages of the present invention, although explained in an environment pertaining to boats and vessels, are likewise achievable on any number of other objects and surfaces. A few nonexclusive examples include trailers, mobile homes, travel trailers, recreational vehicles, military vehicles, and aircraft.

Thus it also will become apparent to one skilled in the art that the claimed subject matter as a whole, including the structure of the apparatus, and the cooperation of the elements of the apparatus, combine to result in a number of unexpected advantages and utilities. The advantages and objects of the present invention, and features of such a coupler, will become apparent to those skilled in the art when read in conjunction with the accompanying following description, drawing figures, and appended claims.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The steps in the methods described in the specification and claims are not intended to suggest a particular order or sequence in which the steps are to occur, and are not intended to suggest or require a particular order. The order or sequence of steps described in this document are not intended to be a limitation on the practice of the present invention.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF A PREFERRED EMBODIMENT

Briefly, the present invention provides a coupler. The coupler of the present invention includes a base formed monolithically with opposing yokes, means for mounting the base on a curved surface, a boom-swivel device removably positionable on the base, and a clevis mechanism slidably and demountably engageable with the boom-swivel device.

Figure 1:
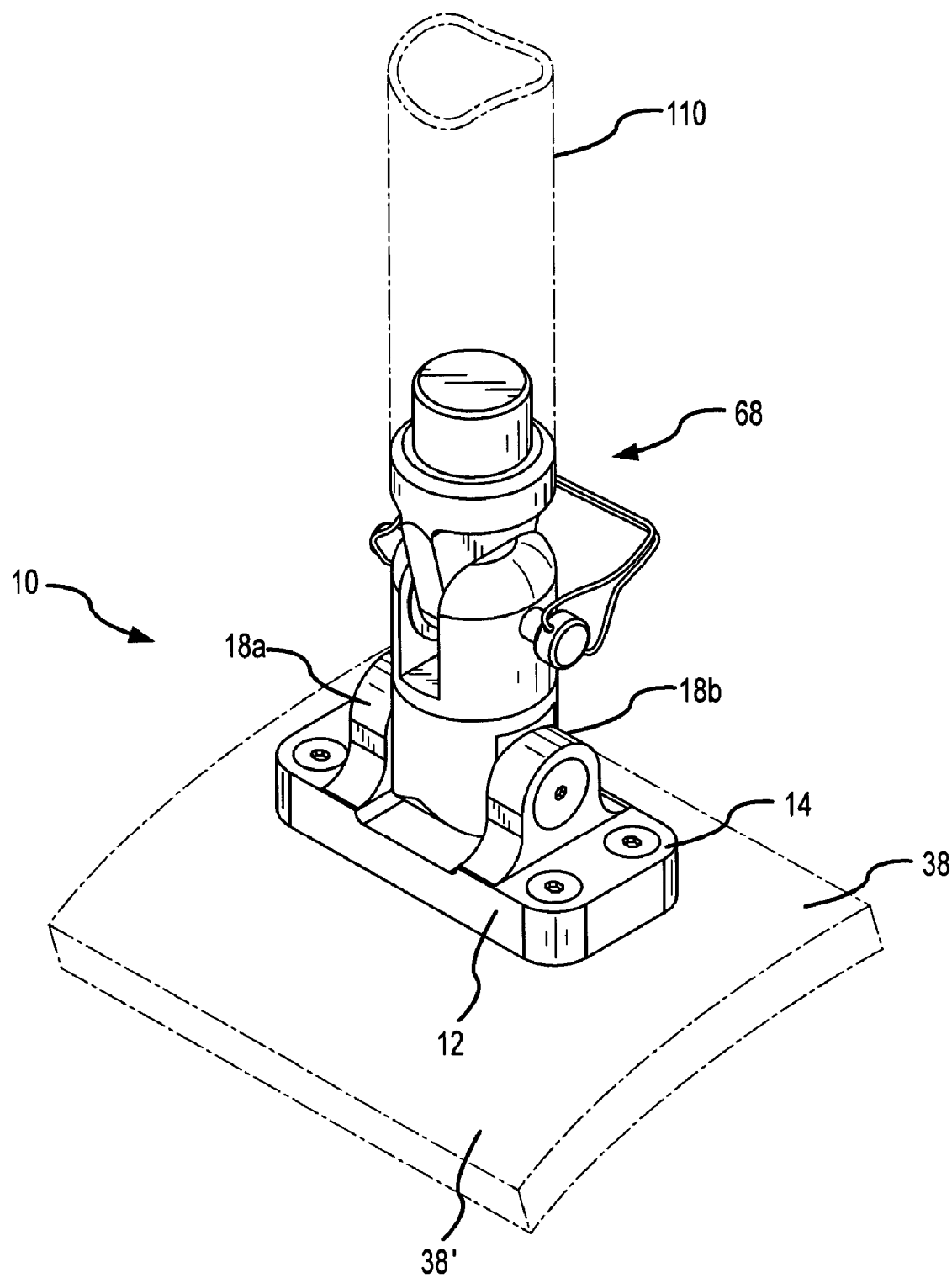
FIG. 1 is a perspective view of the coupler in accordance with the present invention shown mounted on a curved surface.
Figure 2:
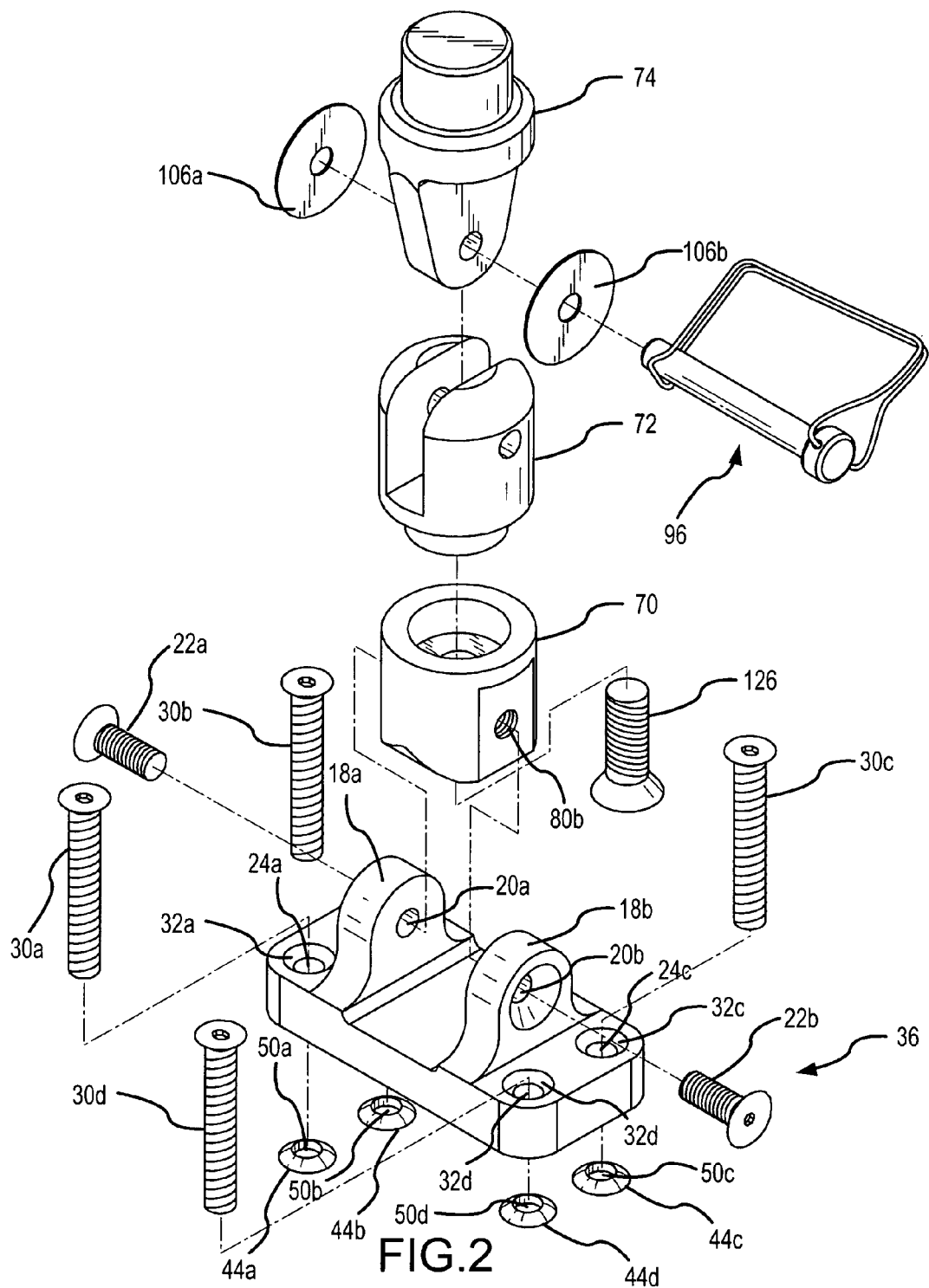
FIG. 2 is an exploded perspective view of the coupler.
Figure 3:
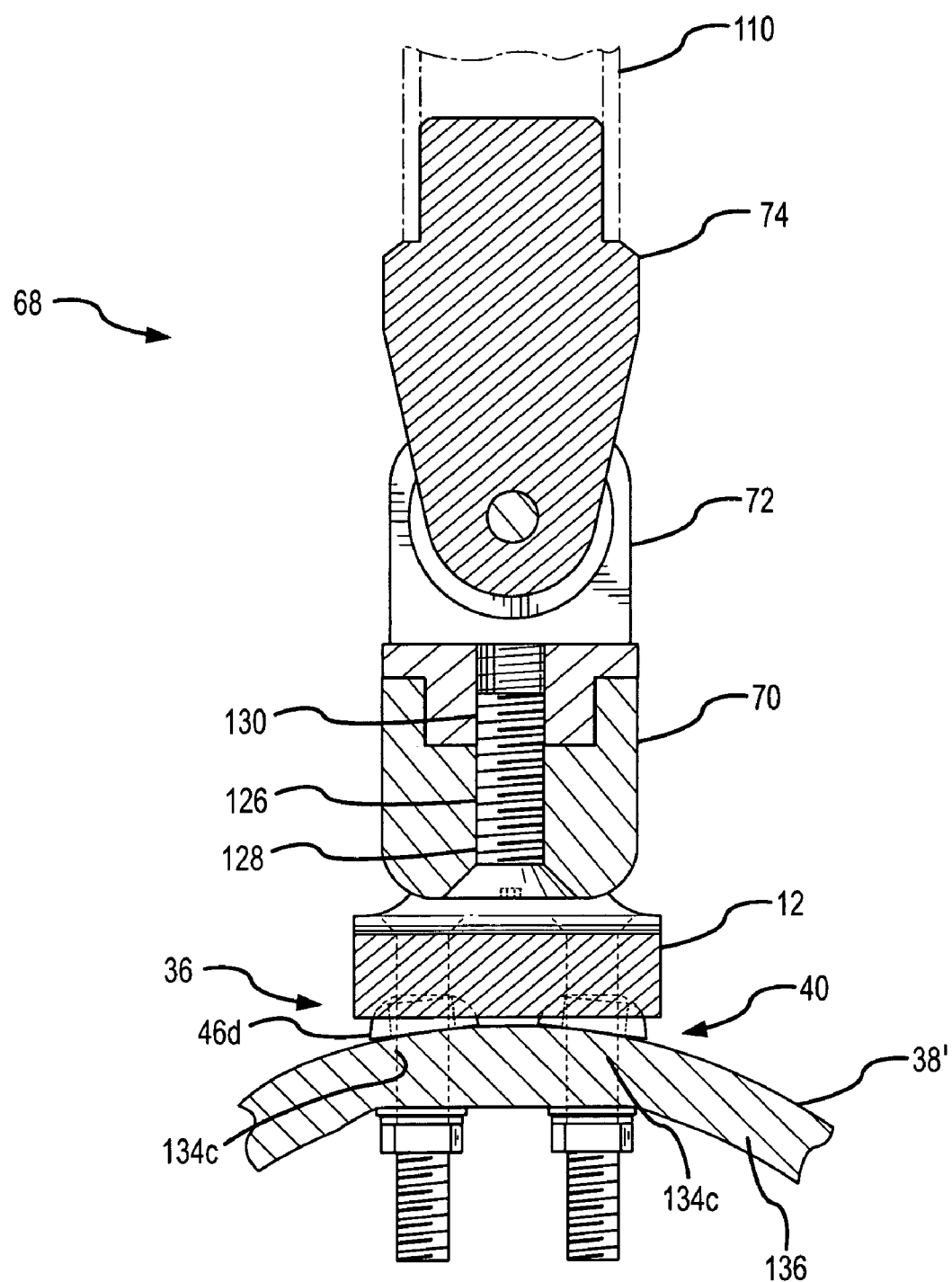
FIG. 3 is an end view of the coupler shown mounted on a curved surface, showing the use of ball washers.
Figure 4:
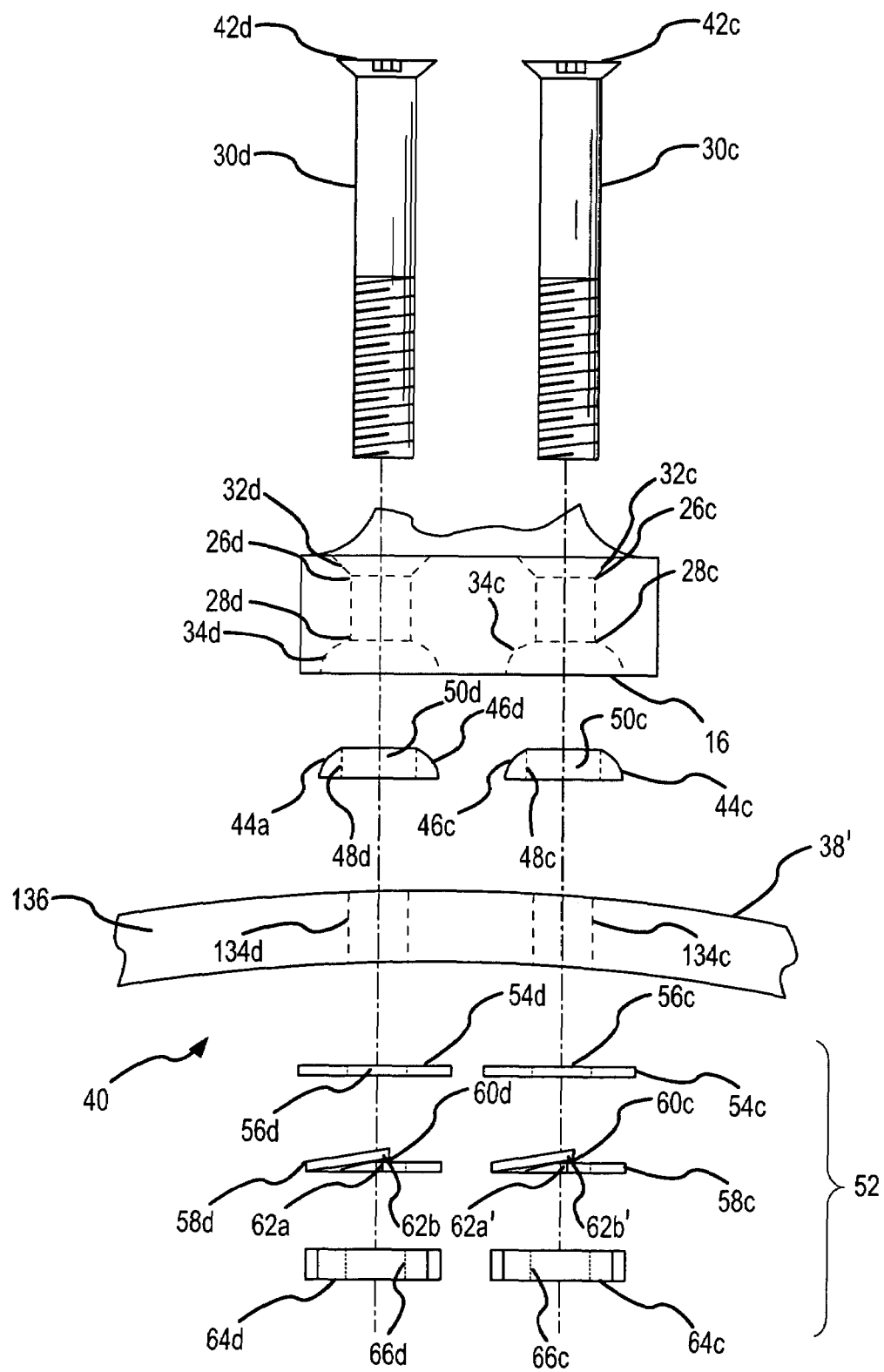
FIG. 4 is an exploded end view of selected components of a portion of the present invention.

FIG. 1 illustrates the coupler of the present invention assembled and mounted on a curved surface. Referring initially, therefore, to FIG. 1, the coupler is shown and generally designated 10. As shown, coupler 10 includes a base 12. Base 12 is formed with an upper side 14 and a lower side 16 as best shown by cross-reference between FIGS. 1, 4 and 9a-9b. Lower side 16 of base 12 is substantially a flat planar surface. Base 12 also includes opposing yokes 18*a,b*. Opposing yokes 18*a,b* are formed monolithically in base 12, and in a preferred embodiment of the present invention, extend substantially at right angles from upper side 14 of base 12. As also shown best by cross-reference between FIGS. 1 and 2, opposing yokes 18*a,b* are further formed with opposing apertures 20*a,b*. Opposing apertures 20*a,b* are formed in opposing yokes 18*a,b* for insertable engagement of one or more first threaded bolts 22*a,b* as best shown in FIG. 2. In addition, as perhaps best shown in FIG. 2, base 12 also includes one or more bores 24. As shown in FIG. 2, one or more bores 24*a-c* are formed in base 12. As shown in FIG. 4, one or more bores 24 are also formed with a proximal end 26 and a distal end 28. One or more bores 24*a-c* are shaped for removable engagement of a second threaded bolt 30. Second threaded bolt 30 is perhaps best shown in FIG. 4 as seconded threaded bolts 30*c-d*. As also shown in FIG. 2, and by cross-reference among FIGS. 3-4, a frustoconical recess 32 is formed adjacent proximal end 26 of the one or more bores 24*a-c* in base 12. In addition, a concave cup 34 is formed adjacent distal end 28*a-c* of one or more bores 24 in base 12.

In a preferred embodiment of the present invention, coupler 10 also includes means 36 formed in base 12 for mounting base 12 on surface 38, perhaps best shown in FIG. 2. As indicated, surface 38 may be a curved surface 38' as shown by cross-reference among FIGS. 1, 3 and 4. As shown by cross-reference among FIGS. 1-4, mounting means 36, in a preferred embodiment of the present invention, is a plurality of bores 24*a-d*. As shown, ball washer assemblies 40*a-d* are combinable with mounting means 36, and include the one or more second threaded bolts 30*a-d*, each formed with a frustoconical cap 42. Frustoconical cap 42 is mateably engageable with frustoconical recess 32 in one or more bores 24*a-c* of base 12. One or more ball washer assemblies 40*a-d* also include one or more ball washers 44. As shown, one or more ball washers 44*a-d* are shaped to include a substantially hemispherical exterior surface 46, an interior surface 48, and duct 50 formed between substantially hemispherical exterior surface 46 and interior surface 48 of one or more ball washers 44*a-d*. In a preferred embodiment of the present invention, duct 50 in a ball washer 44 is formed with a diameter larger than the diameter of second threaded bolt 30*a-d*, as shown best by cross-reference between FIGS. 3 and 4. The diameter of ducts 50*a-d* is larger than the diameter of second threaded bolt 30*a-d* to enhance the mechanical advantage of allowing the present invention to be mounted on other than a straight or level surface 38. As shown in FIG. 3, the dissimilar diameters of ducts 50*a-d* and bolts 30*a-d* allow ducts 50*a-d* to move, adjust, and accommodate to the curvature of a curved surface 38' by allowing concave cups 34*a-d*, shown in FIG. 4, to slidably and movably engage hemispherical exterior surfaces 46*a-d*, as also shown in FIG. 4, while at the same time allowing the larger diameter ducts 50*c-d* to move and adjust in relation to bolts 30*a-d*, so that coupler 10 may be mounted in a variety of positions on a curved surface 38'.

In addition, one or more ball washer assemblies 40*a-d* includes one or more nut assemblies 52. One or more nut assemblies 52, as perhaps best shown in FIG. 4, includes, in a preferred embodiment of the present invention, a flat washer 54 formed with a first opening 56 substantially in the center of flat washer 54, a lock washer 58 formed substantially with a second opening 60 substantially in the center of lock washer 58, as well as spaced-apart opposing ends 62*a,b*, and a threadable nut 64 formed with a threaded third opening 66 engageable with threads on second threaded bolts 30*a-d*.

As shown by cross-reference among FIGS. 1 through 3, coupler 10 of the present invention includes, in a preferred embodiment of the present invention, a boom-swivel device 68. In general, boom-swivel device 68 includes a tub 70 adjustably connectable to base 12, a plug 72 repositionably attachable to tub 70, and a neck 74 rotatably insertable in plug 72. More specifically, as shown by cross-reference among FIGS. 3, 5 and 10A-10C, tub 70 of boom-swivel device 68 includes a chamber 76. Chamber 76 defines a wall that, in a preferred embodiment of the present invention, forms circumferential wall 78. In addition, opposing threaded hollow holes 80*a,b* are formed in wall 78 of tub 70. Opposing threaded hollow holes 80*a,b* as well as through opposing apertures 20*a,b* in opposing yokes 18*a,b* are engageable by first threaded bolts 22*a,b*.

As also shown by cross-reference among FIGS. 3, 5 and 11A-11C, in a preferred embodiment of the present invention boom-swivel device 68 also includes plug 72 that is formed with a body 82. Body 82 of plug 72 is formed with a leading end 84 and a following end 86. In addition, a disk 88 is monolithically formed and positioned on leading end 84 of plug 72. Disk 88 of body 82 is removably insertable into chamber 76 of tub 70 both for positioning purposes and for allowing plug 72 to be rotatably insertable around a longitudinal axis through chamber 76 in tub 70. A groove 90 is formed in body 82 of plug 72. The formation of groove 90 contributes to defining opposing arms 92*a,b* in body 82 of plug 72. In addition, opposing hollow tubes 94*a,b* are formed in opposing arms 92*a,b* of body 82 of tub 70. Groove 90 in body 82 is dimensioned for insertion of neck 74. Opposing tubes 94*a,b* in opposing arms 92*a,b* are included in a preferred embodiment of the present invention for insertion of a clevis mechanism 96 as described subsequently in this document.

As further shown by cross-reference among FIGS. 3, 5, and 12A-12C, boom-swivel device 68 also includes neck 74 that is formed to include a substantially truncated member 98 and a plate 100. Substantially truncated member 98 includes an anterior end 102 and a posterior end 104. Plate 100 is formed monolithically in posterior end 104 of substantially truncated member 98. In addition, a connector extension 108 is monolithically formed in plate 100. In operation, connector extension 108 is dimensioned for insertion into a shaft 110, as perhaps best shown by cross-reference between FIGS. 1 and 3. A passage 112 is formed through substantially truncated member 98, as perhaps best shown in FIGS. 2 and 12A. Passage 112 is formed in neck 74 to allow slidable insertion of clevis mechanism 96 through passage 112. Accordingly, in a preferred embodiment of the present invention, passage 112 is alignable with opposing threaded hollow holes 80*a,b* in wall 78 of chamber 76 of tub 70, as best shown by cross-reference among FIGS. 10A-10C.

As perhaps best shown by cross-reference among 2 and 13 Figures, in a preferred embodiment of the present invention, coupler 10 includes clevis mechanism 96 which includes a clevis pin 114. Clevis pin 114 is formed with a first end 116 and a second end 118, as well as a top portion 120 that is formed monolithically adjacent first end 116. In addition, a lumen 122 is formed in top portion 120 of clevis pin 114. A wire section 124 is provided. Wire section 124 is formed for lockable attachment in lumen 122 in top portion 120. Wire section 124 is further formed for loopable engagement with second end 118 of clevis pin 114 to lock clevis pin 114 in clevis mechanism 96. As will be evident to one skilled in the art, the insertion of clevis pin 114 through passage 112 and through opposing tubes 94a,b allows for rotation of neck 74 in relationship to plug 72 around clevis pin 114.

While the coupler shown in drawing FIGS. 1 through 13 is one embodiment of the present invention, it is not intended to be exclusive, and is not a limitation of the present invention. Claim elements and steps in this document have been numbered solely as an aid in readability and understanding. Numbering is not intended to, and should not be considered as, intending to indicate the ordering or sequencing of elements and steps. While the particular variably positionable coupler system as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

OPERATION

In operation, coupler 10 is assembled by adjustably connecting tub 70 to base 12 by inserting first threaded bolts 22a,b through opposing apertures 20a,b in opposing yokes 18a,b. As perhaps best shown by cross-reference between FIGS. 2 and 3, a third threaded bolt 126 is also provided. Third threaded bolt 126 is threadably engageable with chamber passage 128 formed in tub 70, and with disk passage 130 formed in disk 88 of body 82 of plug 72, to secure plug 72 in tub 70. Anterior end 102 of substantially truncated member 98 of neck 74 is inserted into groove 90. Passage 112 in opposing arms 92a,b of body 82 is aligned with opposing tubes 94a,b in opposing arms 92a,b of plug 72 to enable insertion of clevis pin 114 through aligned opposing tubes 94a,b and passage 112. Wire section 124, having been mounted through lumen 122 in top portion 120 of clevis pin 114, may be looped around second end 118 of clevis pin 114. In addition, one or more wear plates 106a,b may be included as shown in FIG. 2.

FIG. 15 shows the present invention in operation in an operative environment. The operative environment of FIG. 15 shows coupler 10 installed on a variety of curved surfaces 38' on a vessel hull 132. As also shown in FIG. 15, at least one shaft 110 is attached to couplers 10a-c. Couplers a-c are shown mounted on curved surfaces 38'a-c of vessel hull 132.

Having identified one or more curved surfaces 38'a-c as perhaps best shown in FIG. 15, one or more mounting holes 134 as best shown in FIGS. 3 and 4 may be formed in the vicinity of one or more curved surfaces 38'a-c through the shoulder 136 of the surface on which coupler 10 is to be mounted, as also best shown in FIGS. 3 and 4. Shaft 110 may be affixed to connector extension 108 of neck 74. In one embodiment of the present invention, shaft 110 is connected to neck 74 by welding. Plurality of ball washer assemblies 40 are connected to base 12. As shown best in FIG. 3, although surface 38 on which coupler 10 is mounted may be a curved surface 38', ball washer assemblies 40 allow lower side 16 of base 12 to adjust to the curvature of curved surface 38'.

Figure 5:
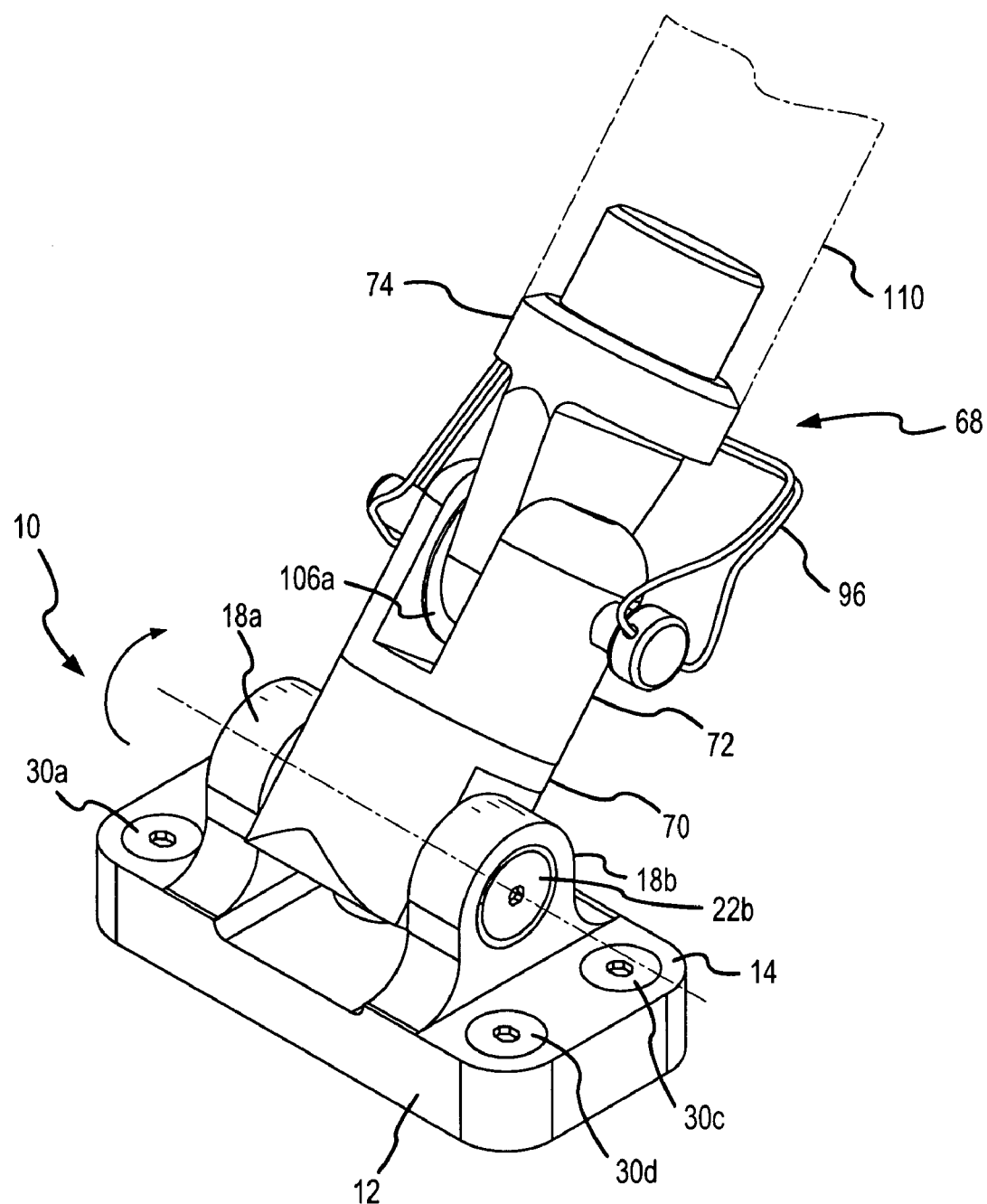
FIG. 5 is a perspective view of the coupler showing possible variable positions.
Figure 6:
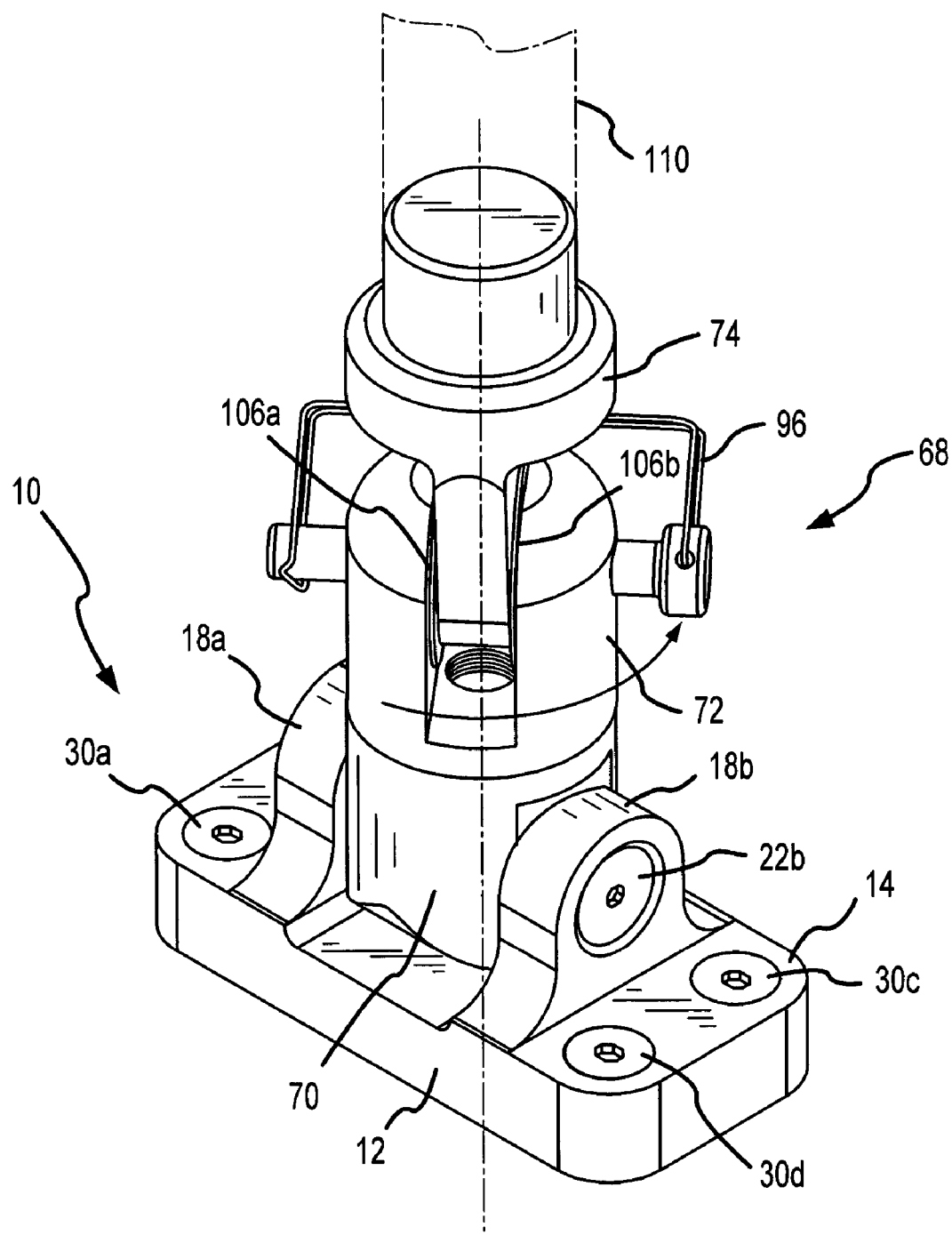
FIG. 6 is a perspective view showing yet another of the variable positions of the coupler.
Figure 7:
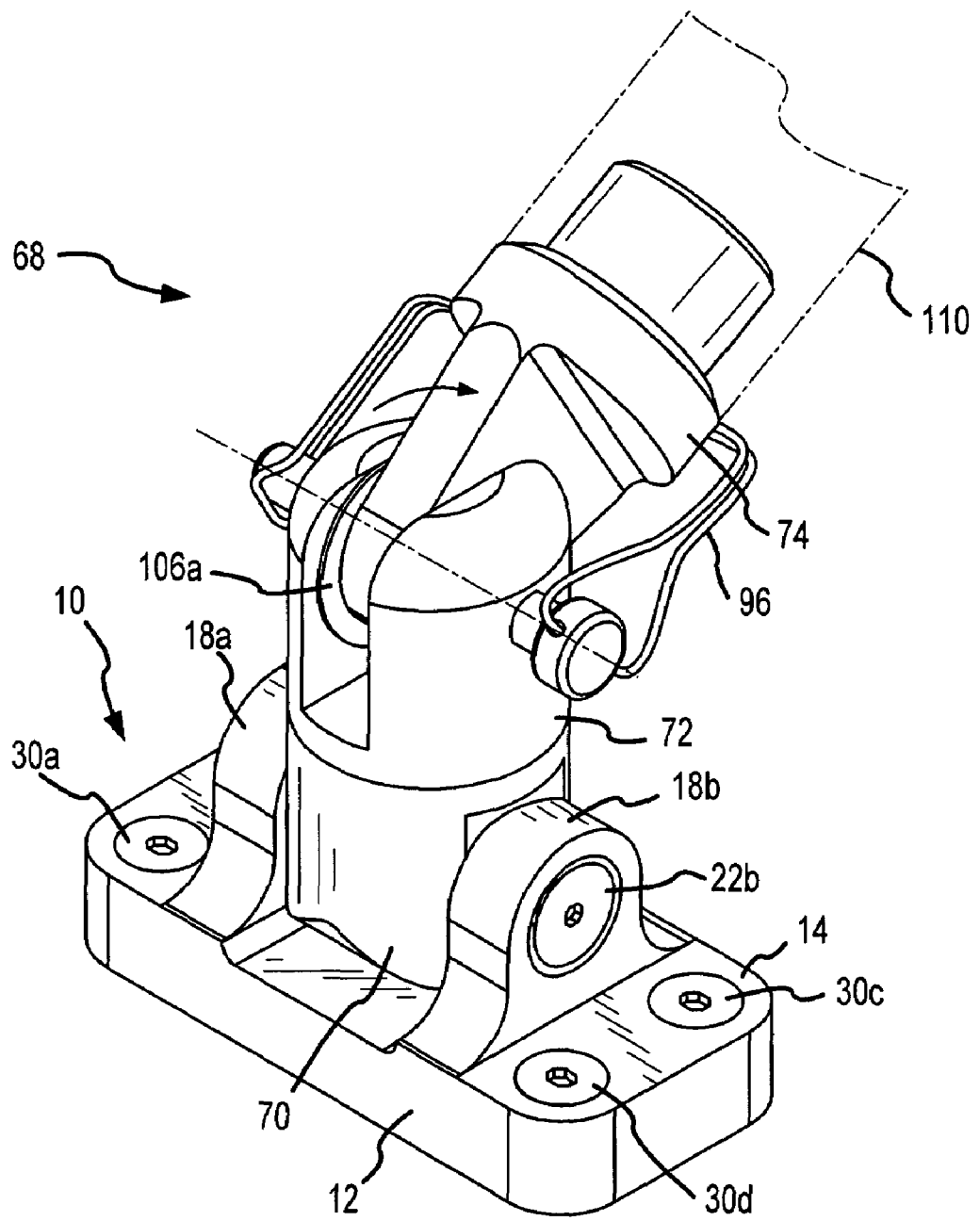
FIG. 7 is a perspective view showing another variable position of the coupler.
Figure 8A:
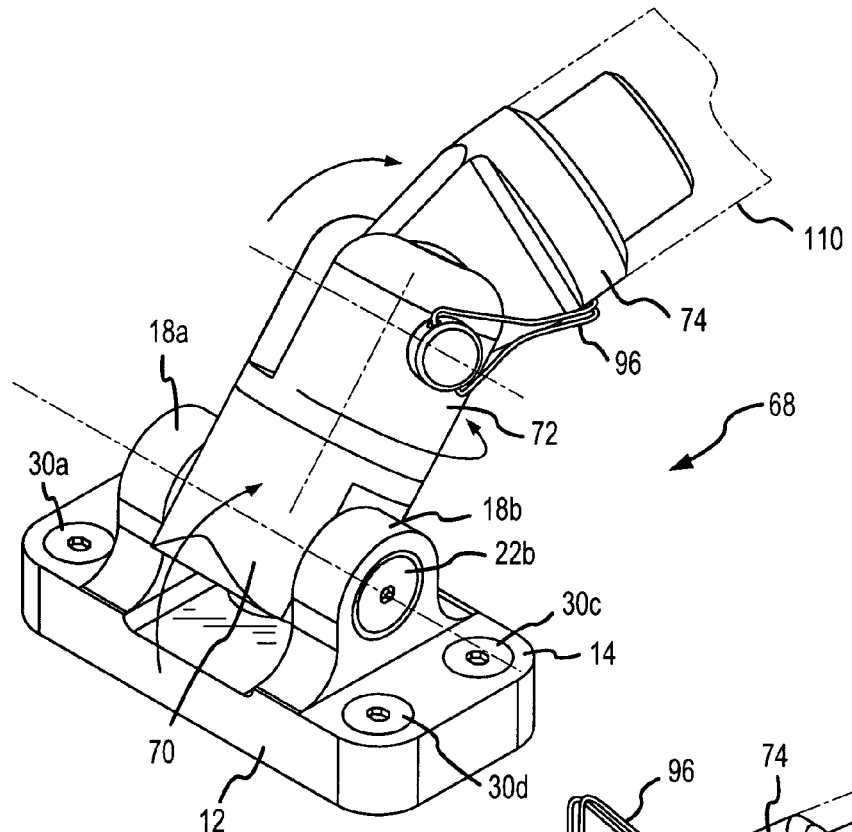
FIG. 8a is a perspective view showing another variable position of the coupler.
Figure 8B:
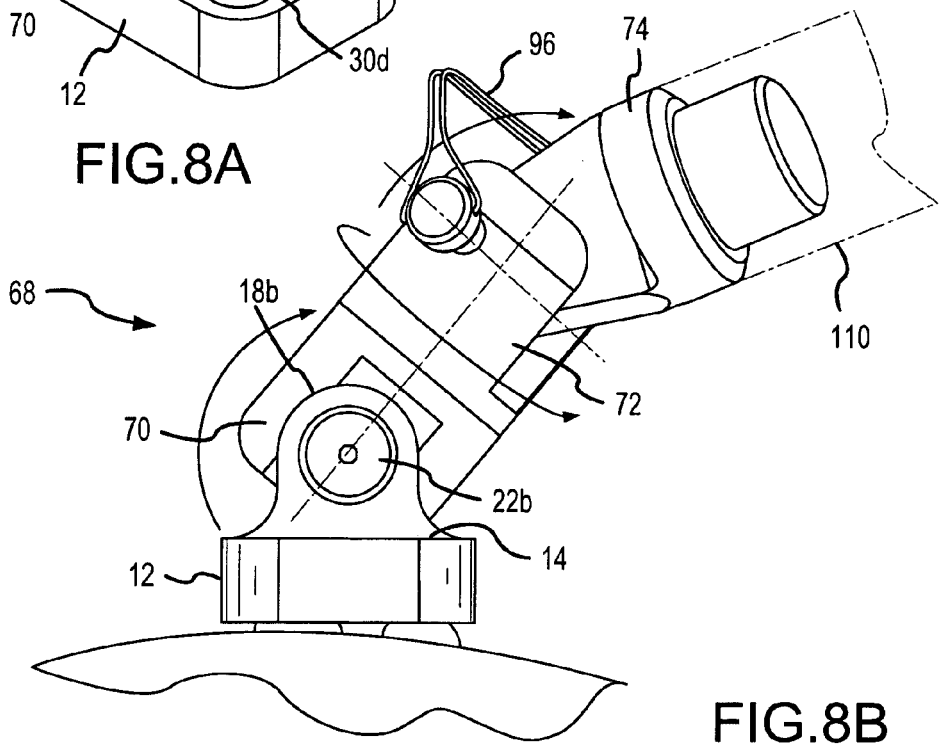
FIG. 8b shows another variable position of the coupler on the ball washers.
Figure 9A:
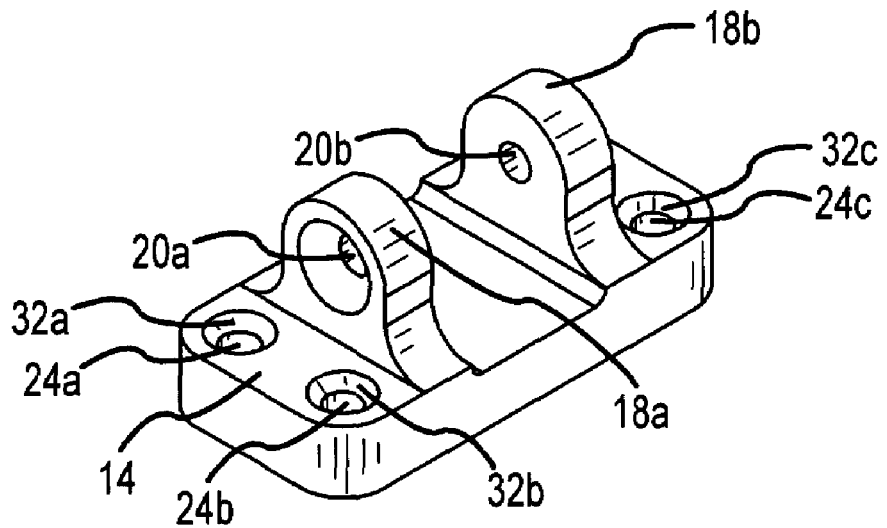
FIGS. 9a-9b show the base of the present invention.
Figure 9B:
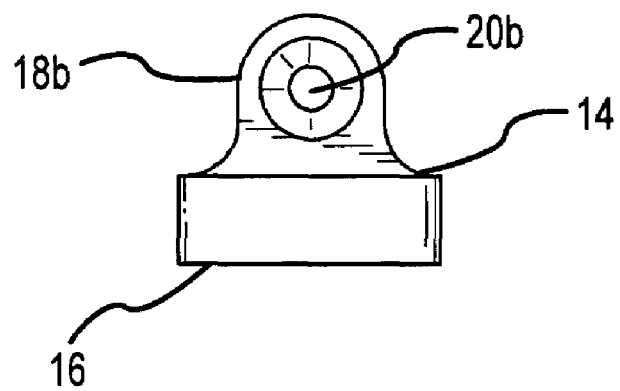
Figure 10A:
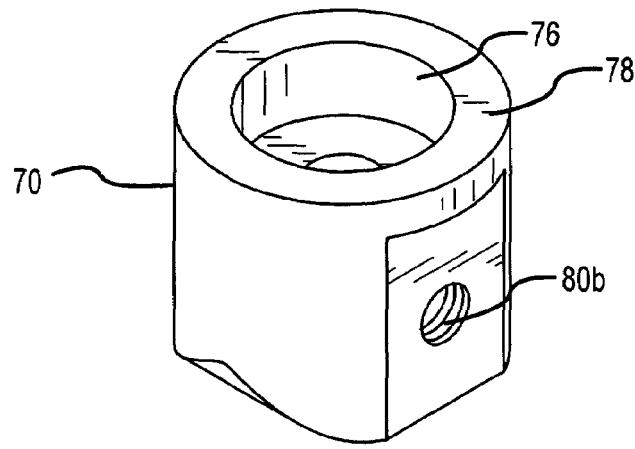
FIGS. 10A-10C shows the tub of the present invention.
Figures 10B, 10C:
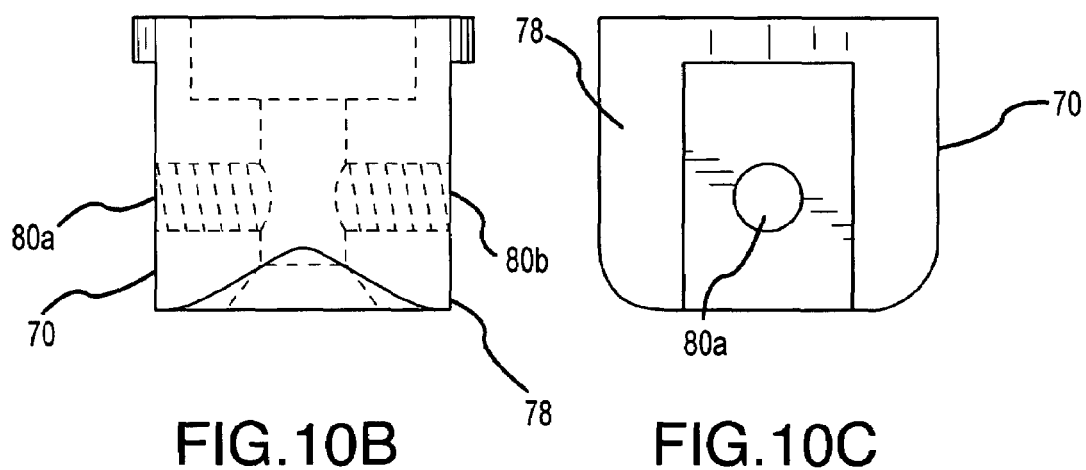
Figure 11A:
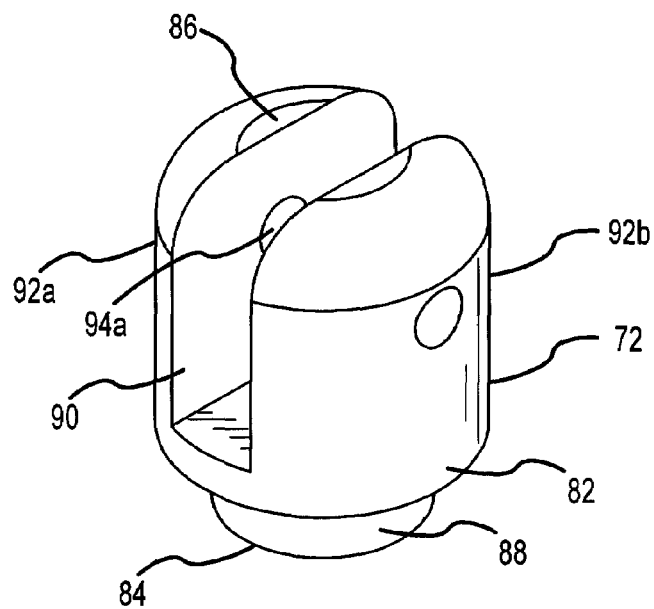
FIGS. 11a-11c shows the plug of the present invention.
Figures 11B, 11C:
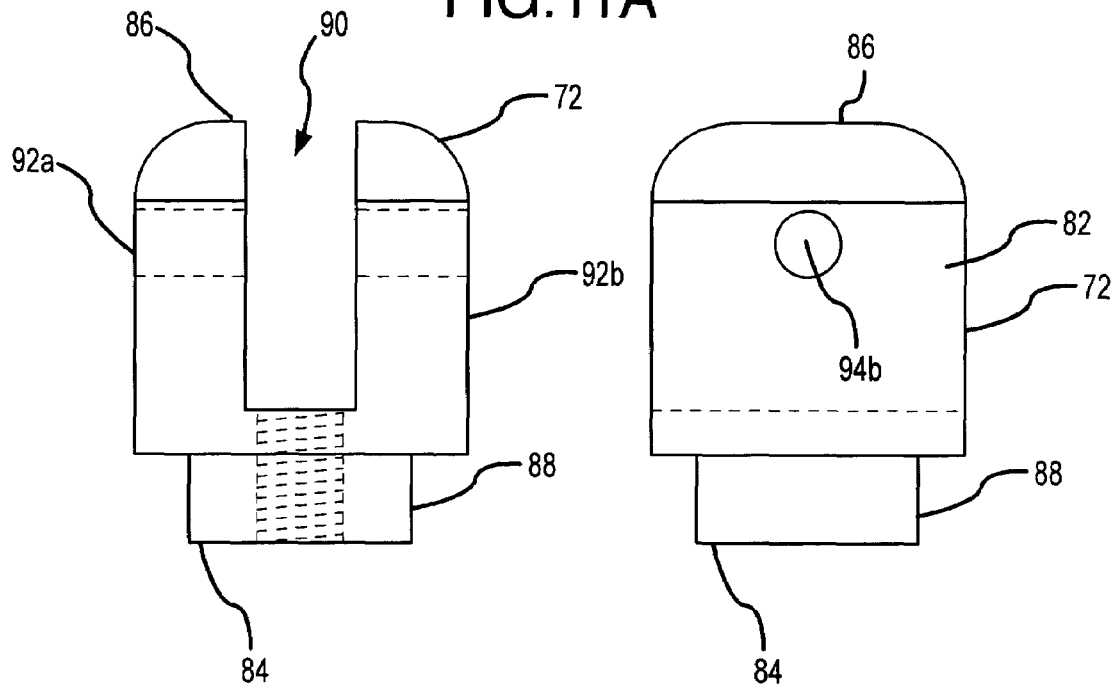
Figure 12A:
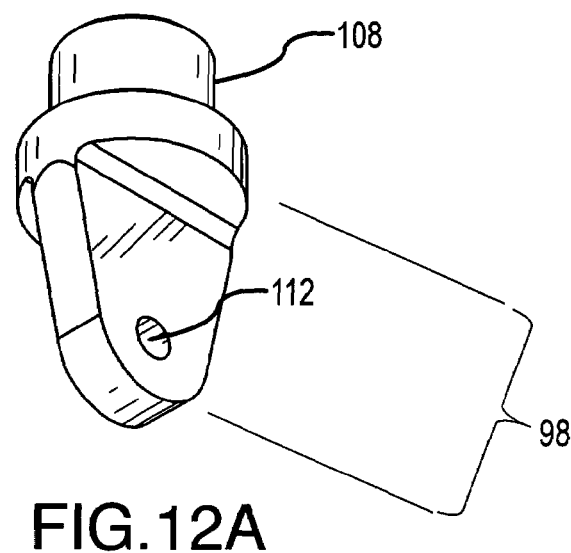
FIGS. 12a-12c show the neck of the present invention.
Figures 12B, 12C:
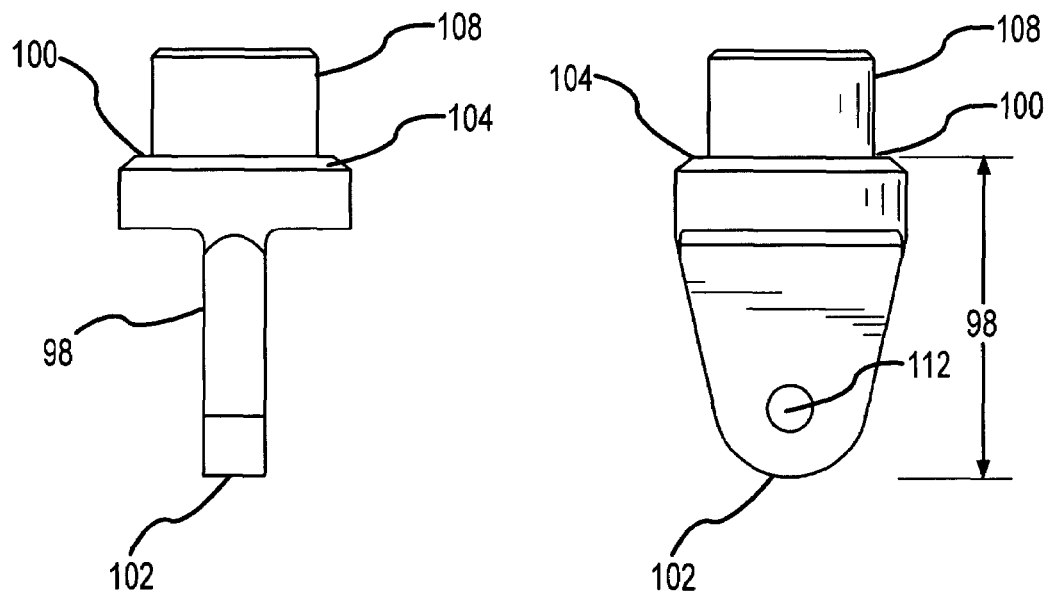
Figure 13:
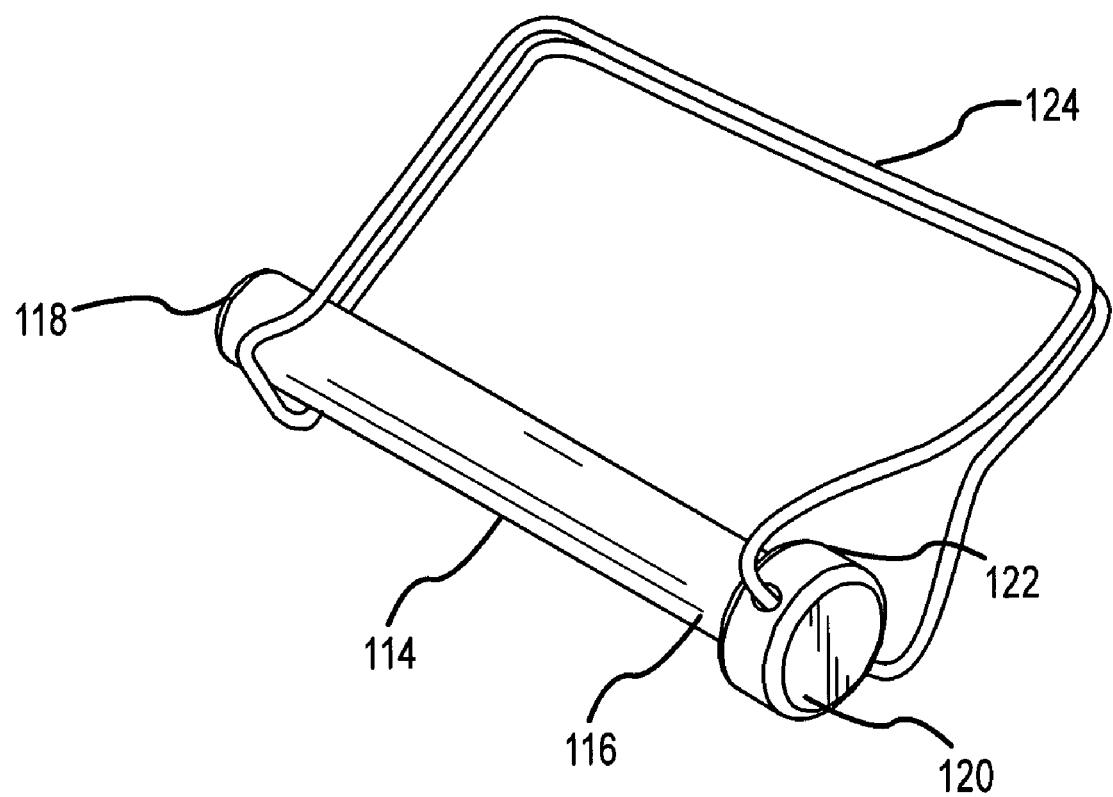
FIG. 13 shows the clevis mechanism of the present invention.
Figure 14:
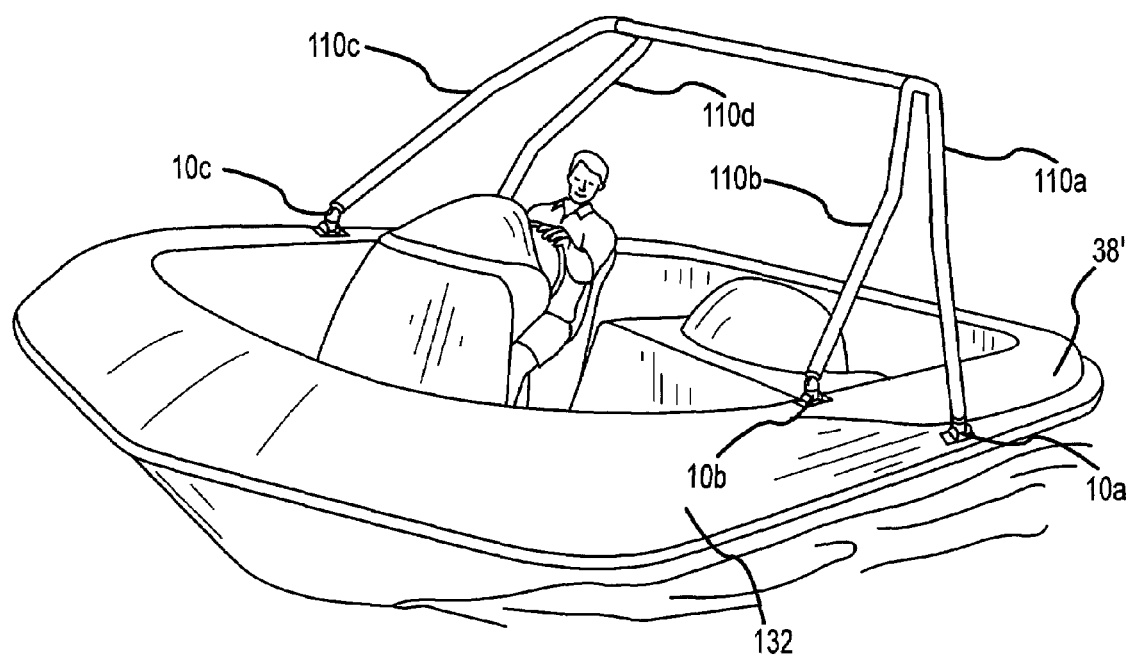
FIG. 14 shows the present invention in an operative environment mounted on the hull of a boat.

As further shown by cross-reference among FIGS. 3-5, hemispherical exterior surface 46 of ball washers 44a,b accommodate concave cup 34 formed in distal end 28 of bores 24a,b. Accordingly, base 12 is mountable on curved surface 38' because ball washer assemblies 40a,b compensate for the curvature of curved surface 38'.

When installed on curved surface 38' of shoulder 134, coupler 10 of the present invention provides several advantages not currently known in the art. In a preferred embodiment of the present invention, duct 50 in a ball washer 44 is formed with a diameter larger than the diameter of second threaded bolt 30a-d, as shown best by cross-reference between FIGS. 3 and 4. The diameter of ducts 50a-d is larger than the diameter of second threaded bolt 30a-d to enhance the mechanical advantage of allowing the present invention to be mounted on other than a straight or level surface 38. As shown in FIG. 3, the dissimilar diameters of ducts 50a-d and bolts 30a-d allow ducts 50a-d to move, adjust, and accommodate to the curvature of a curved surface 38' by allowing concave cups 34c-d, shown in FIG. 4, to slidably and movably engage hemispherical exterior surfaces 46c-d, as also shown in FIG. 4, while at the same time allowing the larger diameter ducts 50c-d to move and adjust in relation to bolts 30c-d, so that coupler 10 may be mounted in a variety of positions on a curved surface 38'. Coupler 10, therefore, provides an apparatus for demountably positioning a shaft on a surface other than a flat surface. As will be evident to one skilled in the art, coupler 10 also allows a user to install the invention on a curved surface without modifying the shape or configuration of the general surface. Also, coupler 10 permits installation of a shaft 110 regardless of the size of shaft 110 or the size or shape of surface 38. Coupler 10 also allows resists forces applied to coupler 10, as well as to shaft 110 connected to coupler 10, as well as to curved surface 38 to which coupler 10 system is attached. As a result, it is not necessary to machine or shape surface 38 in order to install coupler 10.

The invention claimed is:

1. A variably positionable coupler mountable on a curved surface, comprising:
   a base formed with an upper side and a lower side,
      wherein the lower side is a substantially flat planar surface;
   means for mounting the base on the curved surface;
   a tub adjustably connectable to the base;
   a plug repositionably attachable to the tub;
   a neck rotatably insertable in the plug,
      wherein the neck is formed for securing a shaft to the neck; and
   a clevis mechanism slidably and demountably engageable with the plug and the neck.

2. A variably positionable coupler mountable on a curved surface as recited in claim 1, further comprising opposing yokes monolithically extending at substantially right angles from the upper side of the base.

3. A variably positionable coupler mountable on a curved surface as recited in claim 2, further comprising one or more bores formed in the base with a proximal end and a distal end, and further wherein the one or more bores are shaped for removable engagement with a bolt.

4. A variably positionable coupler mountable on a curved surface as recited in claim 3, further comprising a frustoconical recess formed adjacent the proximal end of the one or more bores.

5. A variably positionable coupler mountable on a curved surface as recited in claim 4, further comprising a concave cup formed adjacent the distal end of the one or more bores.

6. A variably positionable coupler mountable on a curved surface as recited in claim 1, wherein the mounting means is a plurality of ball washer assemblies.

7. A variably positionable coupler mountable on a curved surface as recited in claim 6, wherein the plurality of ball washer assemblies includes a second threaded bolt formed with a first diameter.

8. A variably positionable coupler mountable on a curved surface as recited in claim 7, wherein the plurality of ball washer assemblies includes a ball washer.

9. A variably positionable coupler mountable on a curved surface as recited in claim 8, wherein the ball washer is formed with a substantially hemispherical exterior surface, an interior surface, and a duct between the substantially hemispherical exterior surface and the interior surface fonned with a second diameter larger than the first diameter of second threaded bolt.

10. A variably positionable coupler mountable on a curved surface as recited in claim 9, further comprising a nut assembly.

* * * * *